Patented Feb. 22, 1949

2,462,736

UNITED STATES PATENT OFFICE 2,462,736

PREPARATION OF N,N' DIMETHYL-ETHANOLAMINE

William F. Gresham, Wilmington, Del., assignor to E. I. du Pont de Nemours & Company, Wilmington, Del., a corporation of Delaware No Drawing. Application August 9, 1944, Serial No. 548,803

3 Claims. (Cl. 260—584)

1

This invention relates to an improved synthesis for the preparation of N-alkyl substituted alkanolamines, and more particularly to the synthesis of such alkanolamines by the hydrogenation of aldehyde cyanhydrins in the presence of an organic solvent and an alkylating agent.

An object of the present invention is to provide an improved synthesis for the preparation of N-alkyl substituted alkanolamines from aldehyde or ketone cyanhydrins by alkylation during hydrogenation. Another object is to provide a synthesis of such alkanolamines by the liquid phase hydrogenation of an aldehyde cyanhydrin in the presence of an alkylating agent and an inert organic solvent. A further object is to provide suitable reaction conditions and catalysts for conducting the synthesis. Other objects and advantages of the invention will hereinafter appear.

The synthesis is conducted by passing the cyanhydrin to be alkylated with hydrogen, an aldehyde, and a solvent into a reaction zone charged with a suitable hydrogenation catalyst. The reaction is preferably conducted in a large amount of a catalyst and an excess of an organic solvent to inhibit the formation of decomposition products during the reaction. The reaction may be conducted in such a way that contact between the substituted alkanolamine produced and the cyanhydrin is avoided as much as possible.

The cyanhydrins which may be employed in the synthesis include the aldehyde cyanhydrins, and more particularly formaldehyde cyanhydrin, acetaldehyde, n- and isopropanal, n- and isobutanal, and the higher aldehyde cyanhydrins, as well as the ketone cyanhydrins such, for example, as dimethyl, diethyl, methyl ethyl, dipropyl, methyl propyl, and similar symmetrical and unsymmetrical ketone cyanhydrins.

The alkylating agents used in accord with the invention are the aldehydes such, for example, as formaldehyde, acetaldehyde, the propanals, butanals, and the higher straight and branched chain aliphatic aldehydes. These agents should be used in amounts governed by the degree of alkylation desired, generally from 0.2 to 4 mols per mol of the cyanhydrin is ample, the higher limit being used if N-dialkyl substitution is desired.

The inert organic solvent should for optimum results be a solvent for the cyanhydrins as well as for the alkanolamines produced, but one that is not affected by the reaction, and of these the lower molecular weight oxygenated organic compounds are preferred. Examples of such solvents are alcohols, e. g., methanol, ethanol, n- and

2 isopropanol, and n- and isobutanol, which are especially effective in inhibiting the decomposition of the cyanhydrins; the ethers, e. g. dimethyl and diethyl ether; the acetals e. g., methylal, dimethoxy methylether, ethylal, and 1,3-dioxolane and the organic amides, e. g. dimethyl and diethyl formamide.

The presence of the aforesaid inert solvent inhibits the formation of decomposition products of the cyanhydrin employed, and consequently assists in directing the course of the reaction toward the desired alkylated and hydrogenated product. These diluents should preferably be employed in amounts to give solutions containing by weight from in the order of 4 to 20 parts per part of the cyanhydrin.

A number of products may be made by the process of the invention for example, from formaldehyde cyanhydrin hydrogenated in the presence of formaldehyde there are obtained the N-methylethanolamines, such as N-methyldiethanolamine and N-dimethylethanolamine; from higher cyanhydrins, similar N-methyl-substituted alkanolamines e. g. from acetaldehyde cyanhydrin the corresponding N-methylisopropanolamines. Likewise, from acetone cyanhydrin, there are obtained with the inert diluent and formaldehyde N(CH$_3$)$_2$CH$_2$C(CH$_3$)$_2$OH, N-dimethyl-2-hydroxy-2, 2-dimethylethylamine; and CH$_3$N(CH$_2$C(CH$_3$)$_2$OH)$_2$, N-methyl-di-2-hydroxy-2, 2-dimethylethylamine.

The reaction is preferably conducted in the liquid phase and in the presence of a suitable hydrogenation catalyst, such, for example, as nickel, cobalt, fused nickel-cobalt, copper chromite catalyst, Raney nickel catalyst or other hydrogenation catalysts known to be useful in the hydrogenation of nitriles to amines. The reaction is carried out at a temperature ranging from 25 to 200° C. and under pressure, which is not critical, and may be maintained at 1 to 1000 atmospheres. It is preferred, however, to conduct the hydrogenation and alkylation of these nitriles at temperatures between 25 to 150° C. and under a pressure between 200 and 700 atmospheres.

The more detailed practice of the invention is illustrated by the accompanying examples of preferred embodiments of the invention, in which parts are by weight unless otherwise stated:

*Example 1.*—A silver-lined high pressure-resisting shaker tube was charged with 7 parts of formaldehyde cyanhydrin, 7.7 parts of formaldehyde, 140 parts of methanol, and 20 parts of a nickel alloy skeleton catalyst obtained by dissolving about 85% of the aluminum, from a nickel alloy containing 48% nickel and 52% aluminum, by leaching with an alkali. Hydrogen was introduced and the reaction conducted at a temperature between 93 and 98° C. under a pressure of 700 atmospheres for approximately 1 hour. The pressure was released and the products filtered from the catalyst and separated by fractional distillation. Upon analysis, it was found that 38.5% of the formaldehyde cyanhydrin had been converted to N-dimethylethanolamine and 43.7% to N-methyl diethanolamine.

*Example 2.*—The process of Example 1 was substantially duplicated, using 7 parts of formaldehyde, 7.8 parts of formaldehyde cyanhydrin, 140 parts of methanol, and 20 parts of the nickel catalyst. The reaction was conducted at a temperature between 94 and 99° C. for approximately 1 hour. A 46% conversion of the formaldehyde cyanhydrin to N-dimethylethanolamine and 50.7% conversion to N-methyldiethanolamine was obtained.

*Example 3.*—The process of Example 1 was substantially duplicated, using 14 parts of formaldehyde cyanhydrin, 15.6 parts of formaldehyde, 140 parts of methanol, and 20 parts of the nickel catalyst. The reaction was conducted at a temperature between 97 and 107° C. for about 1 hour. The products obtained showed a conversion of 45.5% of the formaldehyde cyanhydrin to N-dimethylethanolamine, 6.8 parts of N-methyldiethanolamine and N-methoxymethyldiethanolamine.

*Example 4.*—The process of Example 1 was substantially duplicated, using 7 parts of formaldehyde cyanhydrin, 7.8 parts of formaldehyde, 140 parts of methanol, and 20 parts of cobalt catalyst prepared by the reduction of cobalt oxide granules with hydrogen at a temperature between 250 and 450° C. The reaction was conducted at a temperature between 95 and 110° C. for about 1 hour. 75% of the formaldehyde cyanhydrin was converted to N-dimethylethanolamine. Some higher boiling compounds were likewise obtained.

*Example 5.*—The process of Example 1 by duplication using 7.7 parts of formaldehyde, 7 parts of acetone cyanhydrin, 140 parts of isobutanol and 20 parts of the nickel catalyst and conducting the reaction at a temperature of 90 to 100° C. for about 1 hour will produce N-methyl and N-dimethyl tertiary-butanolamine.

All of the processes described in the examples were carried out under a hydrogen pressure of approximately 700 atmospheres.

Optimum yields are obtained by the use of more than normal amounts of catalyst. Ordinarily, in conducting catalytic hydrogenation reactions, the catalyst is employed to the extent of about ½% up to a maximum of about 10% by weight based on the compound to be hydrogenated. It has been found, however, in the hydrogenation and alkylation of aldehyde cyanhydrins to N-substituted alkanolamines, that there should be present a large amount of catalyst over this amount, and this is true even with the highly active catalysts such as the nickel and cobalt catalysts described in the examples. Generally the catalyst should be present in amounts ranging from 25% to in the order of 250% or more based on the weight of aldehyde cyanhydrin present. Moreover, it has been discovered that a catalyst containing small amounts of alkali, such as are found in the Raney nickel catalyst, gives higher conversions to N-methyl diethanolamine. Those like cobalt which are alkali free give higher conversions to N-N'dimethylethanolamine.

The process may, if desired, be carried out by way of a continuous process as distinguished from a batchwise process. By such a process the aldehyde cyanhydrin together with the aldehyde, solvent and hydrogen are introduced continuously into a reaction zone, which may, for example, be a cylindrical converter in which the ratio of diameter to length is not greater than about 1:10. The converter is charged with the catalyst and with substantially no free space at the inlet end, so that substantially immediately after the introduction of the reactants they directly contact a relatively large volume of the catalyst under the temperatures and pressures of hydrogenation. This type of converter avoids undue mixing of the product with the cyanhydrins and thereby inhibits the formation of reaction products resulting from such mixtures.

I claim:

1. A process for the preparation of an N-N'dimethylethanolamine which comprises subjecting formaldehyde cyanhydrin to hydrogenation in the presence of formaldehyde and 4 to 20 parts by weight of methanol per part of formaldehyde cyanhydrin at a temperature between 15° and 150° C., a pressure between 200 and 700 atmospheres and in the presence of at least 25% by weight of a hydrogenation catalyst.

2. A process for the preparation of N-N'dimethylethanolamine which comprises subjecting formaldehyde cyanhydrin to hydrogenation in the presence of formaldehyde, from 4 to 20 parts of methanol per part by weight of formaldehyde cyanhydrin, and at least 25% of a cobalt hydrogenation catalyst based on the weight of formaldehyde cyanhydrin, at a temperature between 15° and 150° C., and a pressure between 200 and 700 atmospheres.

3. A process for the preparation of N-N'dimethylethanolamine which comprises subjecting formaldehyde cyanhydrin to hydrogenation in the presence of formaldehyde, from 4 to 20 parts of methanol per part by weight of formaldehyde cyanhydrin and at least 25% of a Raney nickel catalyst based on the weight of formaldehyde cyanhydrin at a temperature between 15° and 150° C., and a pressure between 200 and 700 atmospheres.

WILLIAM F. GRESHAM.

REFERENCES CITED

The following references are of record in the file of this patent:

UNITED STATES PATENTS

| Number | Name | Date |
|---|---|---|
| 2,069,302 | Dreyfus | Feb. 2, 1937 |
| 2,166,971 | Schmidt | July 25, 1939 |
| 2,194,294 | Cass | Mar. 19, 1940 |
| 2,194,314 | Maxwell | Mar. 19, 1940 |

FOREIGN PATENTS

| Number | Country | Date |
|---|---|---|
| 52,609 | Great Britain | Jan. 19, 1942 |